United States Patent [19]
Wilcox et al.

[11] Patent Number: 5,276,970
[45] Date of Patent: Jan. 11, 1994

[54] CODESTRIP IN A LARGE-FORMAT IMAGE-RELATED DEVICE

[75] Inventors: Darren W. Wilcox; Joseph P. Milkovits, both of San Diego, Calif.

[73] Assignee: Hewlett-Packard Company, Palo Alto, Calif.

[21] Appl. No.: 785,376

[22] Filed: Oct. 30, 1991

[51] Int. Cl.⁵ .................. G01D 9/38; G01D 15/16
[52] U.S. Cl. ................... 33/18.1; 33/1 M; 346/139 R
[58] Field of Search ............ 33/18.1, 18.2, 23.03, 33/32.1, 32.2, 32.3, 32.4, 32.7, 34, 35, 1M; 346/139R, 139A

[56] References Cited
U.S. PATENT DOCUMENTS

| | | | |
|---|---|---|---|
| 2,090,183 | 8/1937 | Capstick | 33/32.1 |
| 4,315,371 | 2/1982 | Kotani et al. | 33/32.3 |
| 4,532,521 | 7/1985 | Onoda et al. | 346/139 R |
| 4,544,931 | 10/1985 | Watanabe et al. | 346/139 R |
| 4,888,710 | 12/1989 | Venthem et al. | 346/139 R |
| 4,916,467 | 4/1990 | Niemeyer, III | 346/139 R |
| 5,027,526 | 7/1991 | Crane | 33/755 |
| 5,031,331 | 7/1991 | Herzog et al. | 33/1 M |
| 5,134,779 | 8/1992 | Sprenger et al. | 33/1 M |

*Primary Examiner*—William A. Cuchlinski, Jr.
*Assistant Examiner*—C. W. Fulton

[57] ABSTRACT

A graduated, highly tensioned metallic codestrip is used in a large-format automatic image-related device such as a D-size or larger plotter, yielding positional precision even better than those of prior small-format devices. Preferably perforations in the strip are the graduations, used in determining position of a carriage that holds image transducers (e. g., pens). The strip passes through a slot (open along one edge, closed at the other) in a perforation sensor. The image transducers are very close to the slotted sensor and the strip, to minimize the effect of disturbances arising between the strip and transducers. Two unperforated portions of the strip—one relatively broad, and another relatively narrow border portion—provide very good structural stability for the tensioned strip. Stability under tension is enhanced by wrapping the strip partway around a stanchion at each end. The perforations are formed between the two unperforated portions at a periodicity of one hundred fifty orifices or more per inch, defining position within one three-hundredth of an inch or better. Preferably the strip is oriented with the narrow border nearer the closed edge of the sensor slot. In a multielement marking-device system the novel strip yields fine coordination for marks in adjacent swaths or by plural pens. It also helps meet stringent demands of bidirectional marking.

29 Claims, 14 Drawing Sheets

CODESTRIP IN A LARGE-FORMAT IMAGE-RELATED DEVICE

BACKGROUND

1. Field of the Invention

This invention relates generally to image-related devices in which one or more image transducers interact with a piece of visual-image-bearing medium; and more particularly to improvements in both character and mounting of a codestrip for use in automatic determination of transducer-carriage position in such an image-related device of large format.

A visual-image-bearing medium may be paper, vellum, or any of various types of plastic film. An image transducer is a device for creating or responding to markings on the medium. A codestrip is a graduated strip, generally disposed across an area where the medium is held, and having graduations that can be automatically sensed.

By "large format" we refer generally to devices that accommodate a piece of visual-image-bearing medium that is D size (twenty-two by thirty-four inches) or larger. As will be understood, however, our invention offers advantages, though perhaps less striking, for smaller-format medium as well.

2. Prior Art

Earlier image-related devices have provided both small and large formats. Small-format devices with which we are familiar have employed codestrips made of transparent mylar, with photographically applied indicia as graduations.

The indicia are spaced along the mylar strips with periodicity of ninety per inch, providing positioning that is theoretically good to approximately a one-hundred-eightieth of an inch through interpolation. In practice such accuracy or longterm precision is not realized because of limitations in both the strips and their mounting, as well as the carriage configuration, in the image-related devices.

In image-related devices of the sort under consideration, position of the carriage is established by a servomechanism that includes a sensor. The sensor reads graduations such as those on the codestrip just described, providing information for servocontrolled driving of the carriage to desired positions—all as set forth in, for example, U.S. Pat. Nos. 4,786,803 and 4,789,874 to Majette et al.

In such devices positional precision and accuracy are theoretically very good because all components of the carriage drive train out to and including the sensor (which is on the carriage) are inside the servocontrol loop. We have noted, however—and this recognition actually may form part of our inventive acts, with respect to the present invention—that possible sources of error still remain outside the servoloop.

Although the carriage is solid and not subject to major deformation in use, yet in contributing to transducer positional imprecision any angular cocking of the carriage that is dynamic (i.e., that changes during operation) is multiplied by an effective lever arm related to the distance between sensor and transducer. In earlier small-format devices, indeed, proximity of transducers to codestrips has not been closely controlled and has in some cases exceeded one and a half inches.

Furthermore mylar codestrips are dimensionally unstable because they expand and contract as a function of both temperature and humidity. Even more problematic is their lack of structural integrity: at elevated temperatures and mounting tensions, mylar creeps.

We digress briefly from the prior-art discussion: we have studied possible ways of adapting mylar codestrips for large-format devices, and concluded that the mylar would require costly support schemes to overcome the limitations just stated. For example, mylar strips might be placed between solid stabilizing bars in a sort of sandwich arrangement, or hung from pegs spaced across the medium, or both—awkward and expensive provisions at best.

Furthermore, due to the bulkiness of the supports, when supported in accordance with such schemes the mylar strips would not be readily positioned close to the image transducers. Poor proximity, as already explained, invites imprecisions arising in portions of the mechanism between the strip and the transducers.

For the small-format devices, however, both the precisional environment and the precisional demands are more forgiving. That is, the smaller devices are inherently more precise on an absolute basis because of the smaller carriage travel, shorter support mechanisms, etc.; and also tend to be used for types of graphics that are meant primarily for display and general information, not requiring high precision.

In a large-format device, positional error accumulates across the larger medium-holding bed, while carriage positioning elements are inherently more susceptible to vibration, cocking of the carriage and so forth. Moreover the large-format devices generally have application in relation to mechanical drawings, precision graphs and like highly technical graphics which users expect to show accurately even small differences between large dimensions.

Returning to the discussion of prior-art devices, some devices have been made using codediscs, rather than codestrips. The codediscs have been thin metallic discs held by adhesive to servomotor hubs, and carrying near-peripheral radial graduations in the form of etched orifices read by transmission-sensing detectors—analogously to the detectors used with mylar codestrips.

In such a disc an unperforated narrow peripheral border, just outward from the orifices, provides structural integrity to the codedisc. The orifices near the edge of the disc, and the unperforated border, both extend radially outward beyond the motor hub and pass through a slot in the transmission-type sensor.

Possibly such a disc is potentially more precise than a strip in determining rotation of a servomotor shaft. Indeed, as many as five hundred orifices have been provided in a disc that rotates once per inch of carriage travel; however, stating the relationships in this way can be misleading as the advantage is almost abstract or academic.

Such a system fails to account for play in the mechanism at all the various points between the shaft and the transducer or transducers, accordingly leaving transducer position known only imprecisely. (The readout from the codedisc is therefore analogous to a digital counter that has more significant figures than the precision with which it can count.)

In other words, with a hub-mounted codedisc all disturbances arising between the motor and the image transducers are outside the servocontrol loop, and the positional determination is therefore susceptible to error due to such disturbances. Here, while error control is more important than in the smaller-format mylar-strip devices discussed earlier, much more of the drive train is outside the loop than in those smaller-format devices; hence this susceptibility is doubly more severe than the problems stated earlier for those smaller devices.

In any attempt to overcome this susceptibility, such disturbances must be characterized and rejected through specifications for component manufacture. The overall result is increased product cost and nevertheless poorer positional precision.

The problems that arise in use of an elongated encoder strip are very different from those that arise in use of a circular encoder disc. Codediscs do not make use of the benefits of metal that might mitigate the problems of codestrips.

More particularly, in a hub-mounted disc there is no tension, and humidity would not be expected to have much influence on the angular dimensions of a disc—certainly not much tendency to perturb the angular relationships between different radial graduations.

A preferred solution to the problem of obtaining high precision in a codestrip should also minimize the necessity for other innovations; and should employ, to the extent possible, only such new component configurations as are very straightforward. Thus in particular we regard it as extremely desirable to employ sensors that have been used in the past for mylar codestrips, and to do so within the context of a novel electromechanical layout for a transducer carriage which—while new in important ways—preserves as many features of a previously proven layout as possible.

Sensors previously used in small-format devices with which we are familiar have been thoroughly tested and proven off-the-shelf units that read indicia on the mylar codestrips by detection of light transmitted through the strips. The sensors are slotted for passage of the codestrips, and are capable of providing information needed for interpolating carriage position between the codestrip indicia. Each slot has an open edge and a closed edge, and the active sensing elements are placed very near to the closed edge of the slot.

Similarly, transducer-carriage mechanical and electrical layouts in certain earlier units have proven performance in, e.g., microphonic and electromagnetic-interference rejection.

SUMMARY OF THE INVENTION

Our invention has two major aspects, which we shall discuss in turn. As will become clear, we prefer to use the two aspects in concert for greatest enjoyment of the benefits of the invention, although in principle they are independent.

In its first aspect, our invention is a codestrip for use in positioning a carriage of a large-format automatic image-related device. The codestrip comprises a metallic strip longer than the transverse dimension of a large-format visual-image-bearing sheet.

The first aspect of our invention also includes some means for tensioned mounting of the strip to such an image-related device. For purposes of generality and breadth in expression we shall call these means the "mounting means".

These mounting means are defined in the ends of the strip. They may encompass any of a variety of mounting features such as holes, notches, deformations or welded-on bosses, etc., or even a substantially featureless section of strip that is held by clamping to a mount.

This aspect of our invention also includes a series of very narrow orifices defined along the strip. These orifices serve as fine graduations for establishing position of such a carriage along the strip.

The foregoing may represent a description or definition of the first aspect of our invention in its broadest or most general terms. From what has already been said, however, even in this broad form our invention successfully addresses the major aspect of the prior-art problems discussed earlier.

More specifically, use of a metallic strip eliminates sensitivity of the carriage-position determination to humidity, and very nearly eliminates sensitivity to tension and temperature. Because much higher mounting tension can be used, permanent distortion such as the "creep" experienced with mylar strips is essentially eliminated.

As will be understood, however, we prefer to practice our invention with certain additional features or characteristics that enhance or optimize the advantages of the invention.

For example, we prefer that the metallic strip comprise a a relatively broad substantially unperforated portion having structural stability when under tensioned mounting as just described. We also prefer that the strip comprise a relatively narrow unperforated border portion, and that the series of orifices be defined in the strip between the broad and narrow unperforated portions.

In its second major aspect, our invention is a large-format automatic image-related device. It is for use with a large piece of visual-image-bearing medium, such as paper, vellum, etc.

In this second aspect, our invention includes some means for holding a large piece of such a medium. Again for breadth and generality we shall refer to these as the "holding means".

This second aspect of the invention also includes a carriage, and some means for support of the carriage—which latter, for the reasons indicated earlier, we shall call the "support means". The carriage and support means are disposed for travel of the carriage along the support means and across the holding means.

Further the second aspect of our invention includes one or more image transducers retained on the carriage. The transducers are for interaction with a piece of visual-image-bearing medium, when such a piece of medium is held in the holding means.

The invention in its second aspect also includes some means for automatically determining the position of the carriage and the image transducers relative to such medium when held in the holding means. Analogously to the previous general usages, we shall call these means the "position-determining means".

The position-determining means include a codestrip disposed across the holding means. The codestrip is made of metal.

This metallic strip is tensioned across the holding means. It defines sensable graduations for establishing the carriage position precisely.

As in the case of the first aspect of our invention, the foregoing paragraphs may constitute a definition or description of the most general or broad form of the second aspect of the invention. Even in this form, however, this second aspect of our invention resolves the described problems of the prior art—generally in the same ways as already presented for the first aspect.

Nonetheless we prefer to practice the second aspect in conjunction with certain additional advantageous characteristics or features.

For example, we prefer that a stanchion be defined at each end of the carriage, respectively, for gripping a respective end of the metallic strip. We also prefer that at least one end of the strip be wrapped at least partway around its respective stanchion.

We have found that this configuration is particularly beneficial in resisting adverse effects of high tension in the strip, especially in event of accidents involving crumpling of the image medium when the crumpled medium may strike the codestrip. Preferably this arrangement is used at both ends of the strip.

As another example we prefer to dispose the image transducer or transducers so as to render substantially insignificant any positional perturbation that arises between the strip and the transducer or transducers. Any of a variety of different disturbances can result in a small but significant component of motion in the direction parallel to the strip.

(Such perturbations can be, for instance, in the form of cocking or twisting of the carriage relative to its support means, most typically due to forces developed in operation of the carriage drive system. Also such perturbations can take the form of vibration from external sources such as nearby traffic, elevators and other heavy equipment.)

We prefer to so dispose the one or more tranducers by retaining it or them on the carriage to interact with the visual-image-bearing medium within approximately one inch from the metallic strip. Attention to this dimensional detail can be very important in controlling the strip-parallel component of motion just described.

All of the foregoing, and still other, operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
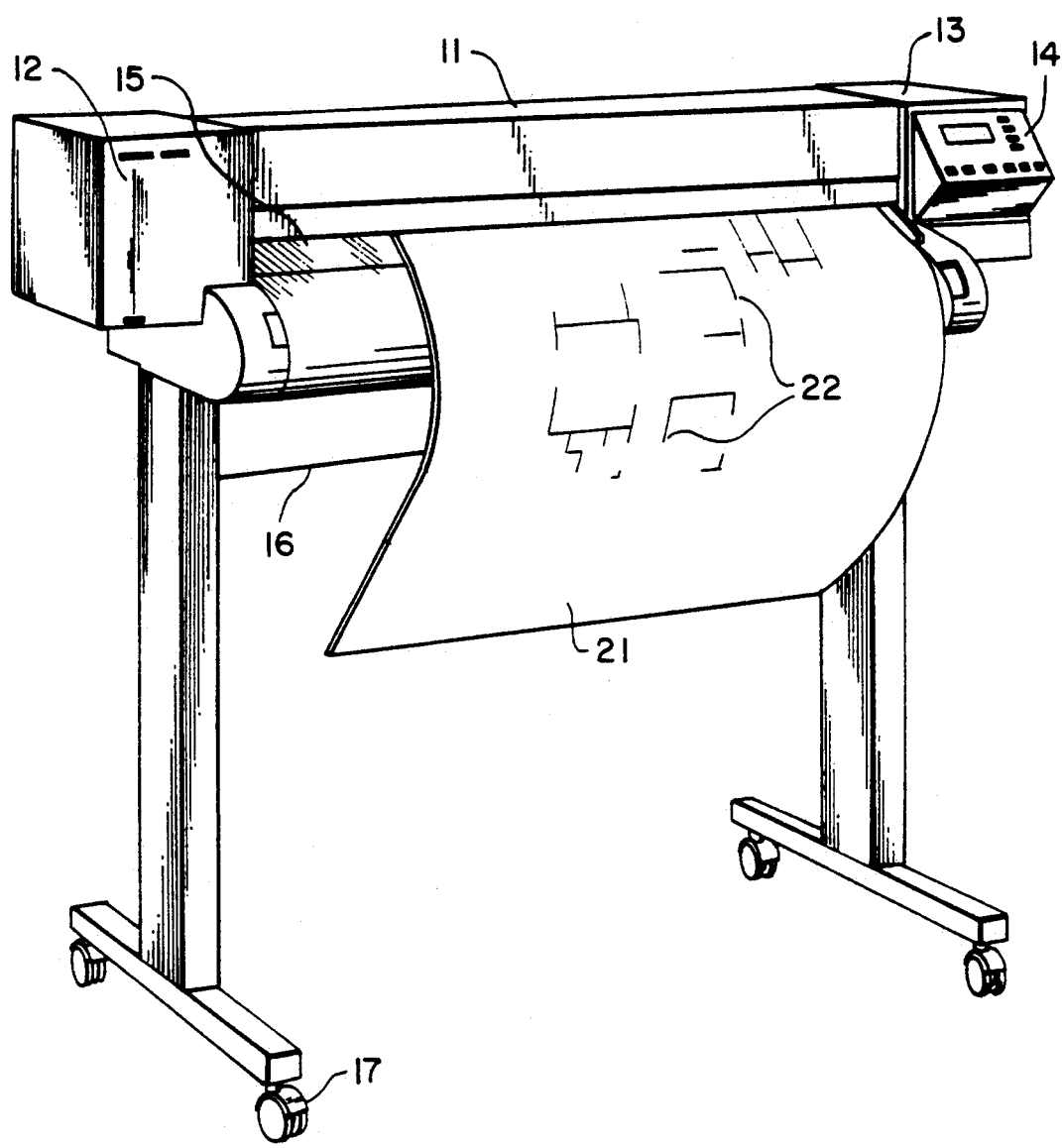
FIG. 1 is an exterior perspective view of a preferred embodiment of our invention or a device using our invention, namely an image-related device—shown with a large piece of visual-image-bearing medium partially inside the device.

The image-related device of FIG. 1 is of a marking-implement type, namely a large-format plotter. It includes a housing 11 with left- and right-hand drive-mechanism enclosures 12, 13. Controls and indicators 14 are disposed in the right-hand enclosure 13.

A movable bed or roller 15 holds and transports a large-format piece of medium 21, on which image elements 22 are formed by the device. A sturdy crossgirder 16 and wheeled stand 17 provide a stable platform well above floor level.

Figure 2:
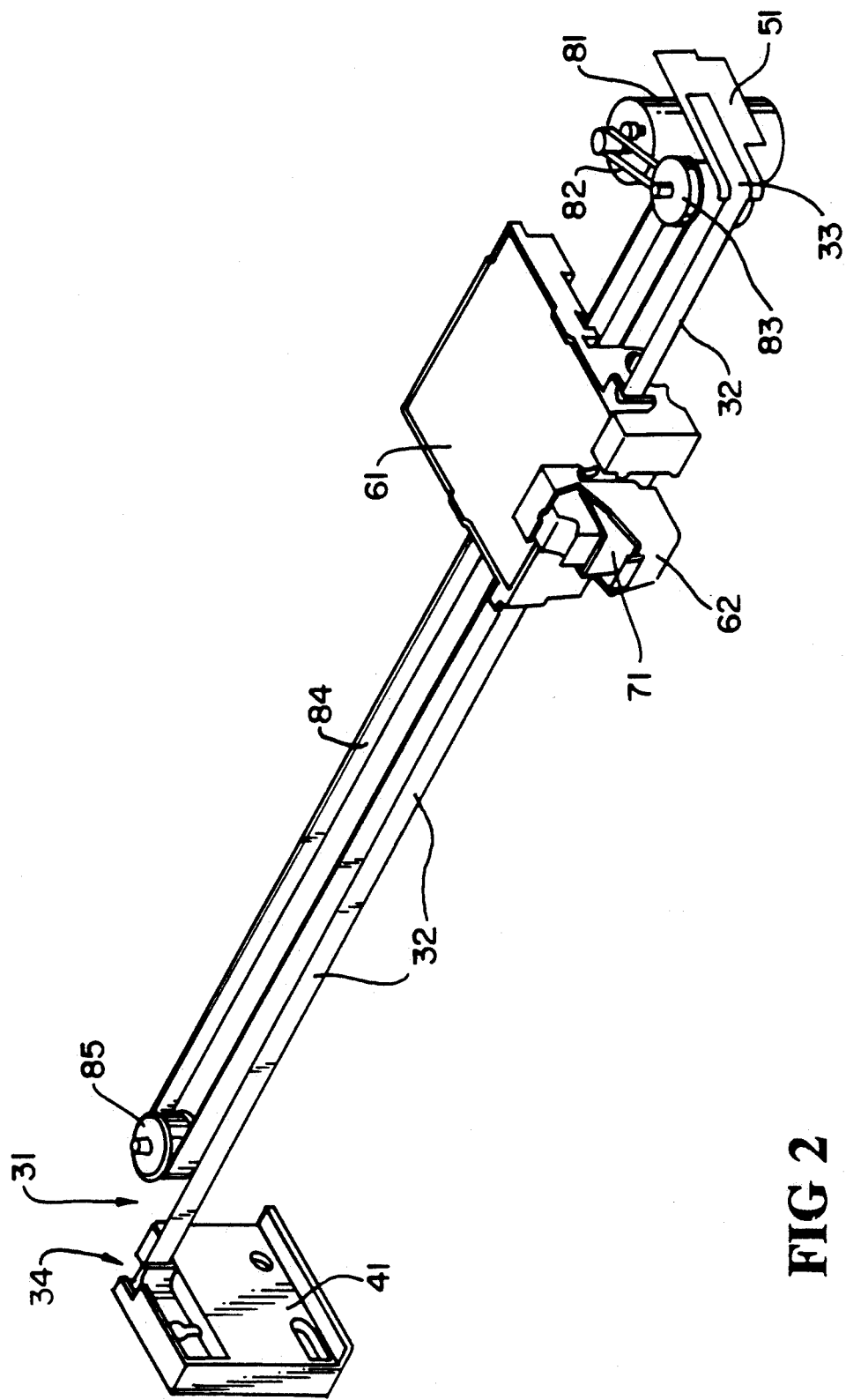
FIG. 2 is an enlarged perspective view of portions of the FIG. 1 embodiment, particularly the carriage with a single transducer, carriage drive, codestrip and codestrip stanchions.

Within the housing 11 is the codestrip 31 (FIG. 2). Its major portion 32 extends within most of the length of the housing, and at points 33, 34 near its ends the strip 31 is wrapped ninety degrees around each of two respective stanchions 41, 51.

The strip 31 is threaded through a carriage 61, which carries a transducer holder 62 and transducer 71 such as a thermal-inkjet pen. The carriage is driven to left and right by a drive train 81-85.

The drive train includes a servomotor 81 which powers a small endless belt 82. That belt rotates a driven idler 83, which in turn powers a long carriage-connected endless belt 84. The latter also encircles an undriven idler 85.

Figure 3:
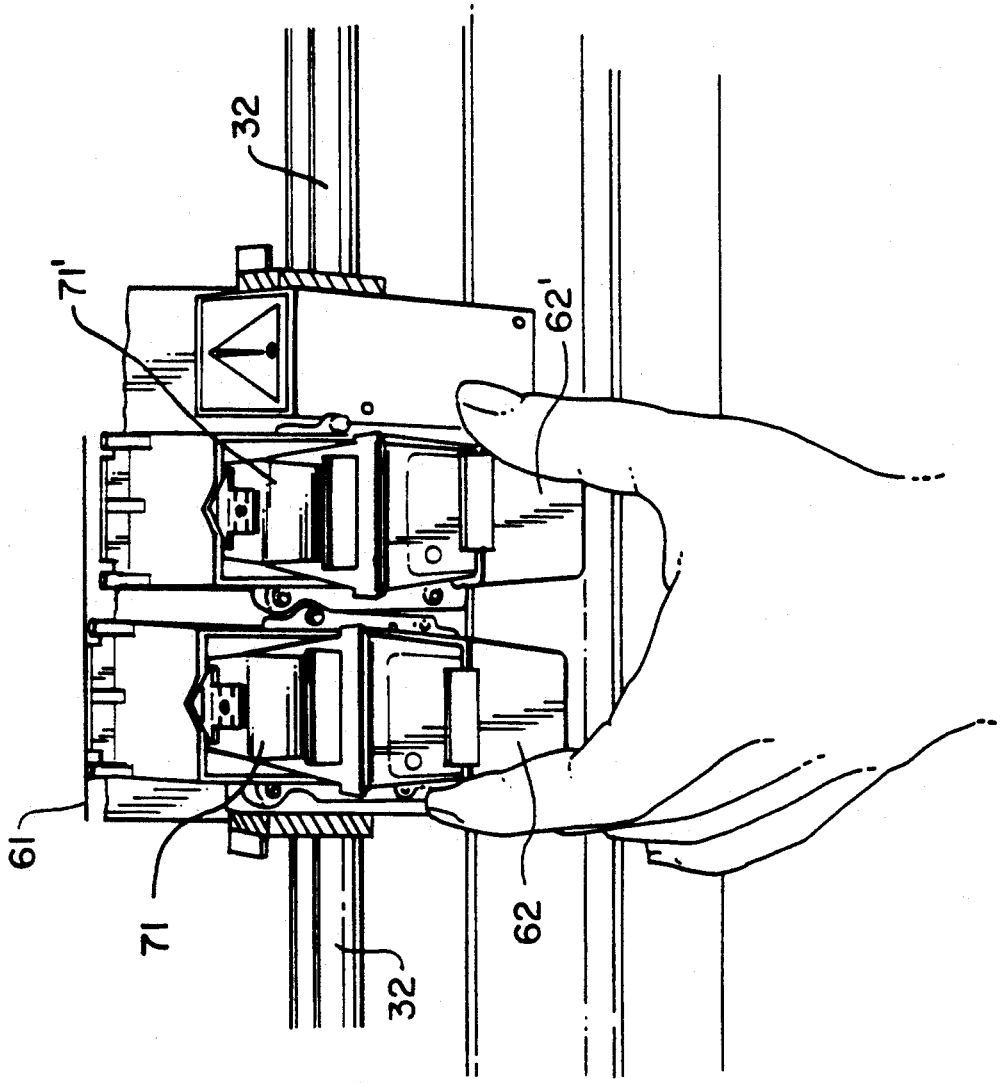
FIG. 3 is a further enlarged frontal elevation of a carriage that is very generally similar to that of FIG. 2 but with dual transducers.
Figure 4:
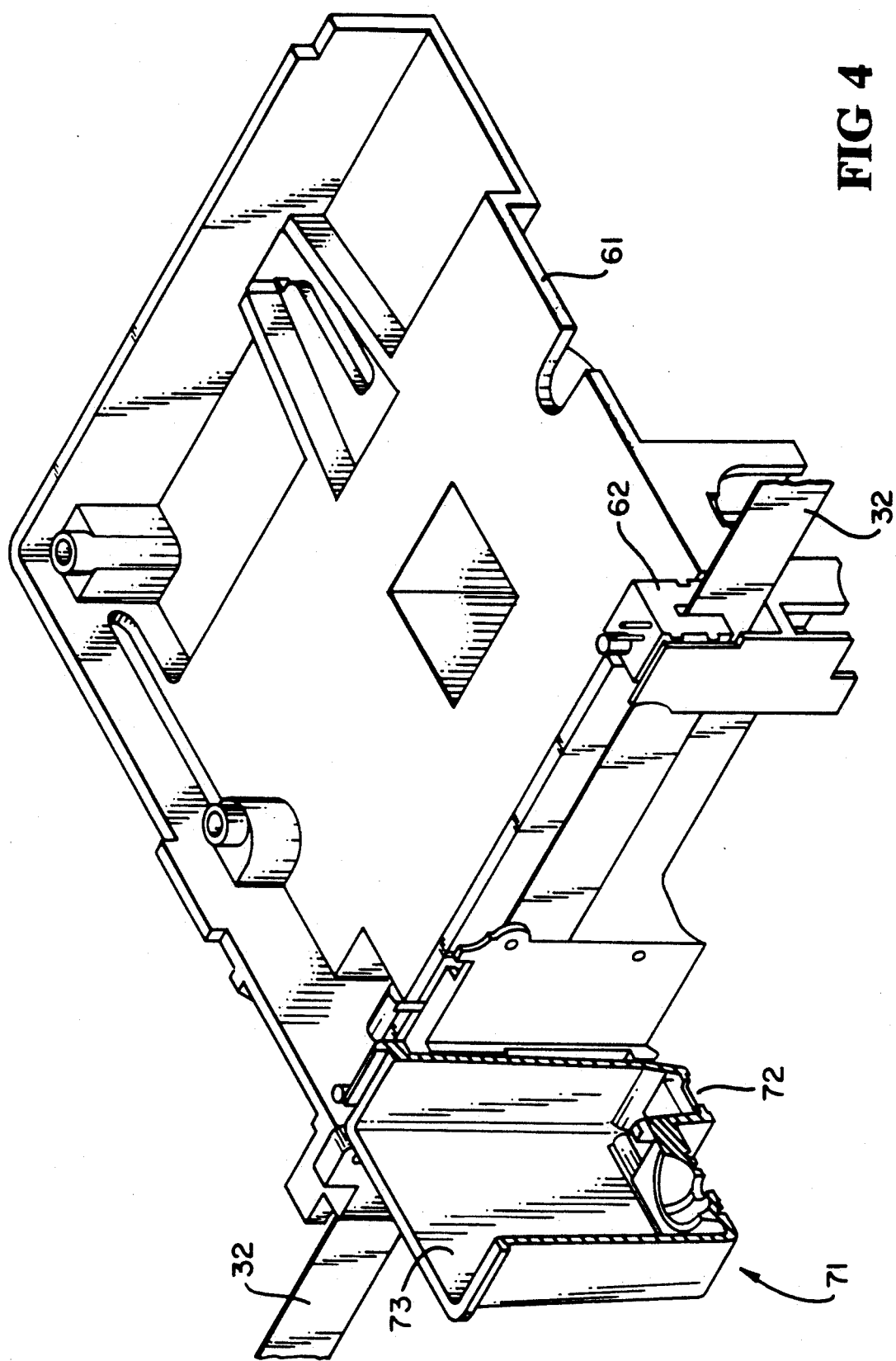
FIG. 4 is an even further enlarged perspective view, drawn partially broken away, of a generally representative FIG. 2 or FIG. 3 carriage housing, and including the casing of one representative transducer, and also showing the codestrip and its sensor.
Figure 5:
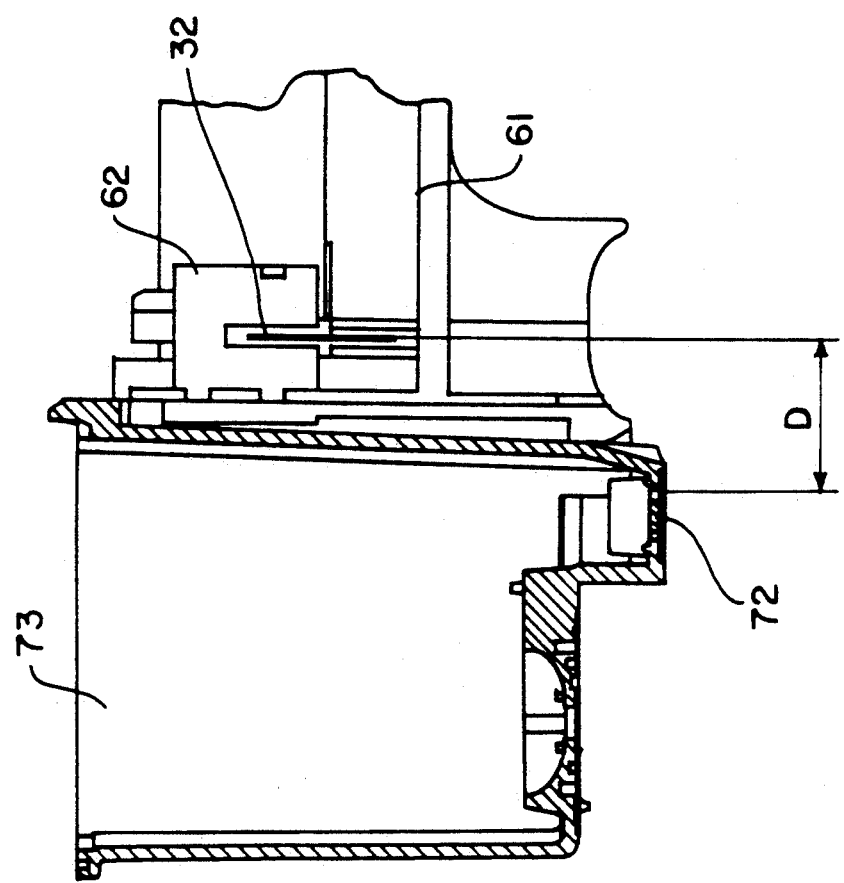
FIG. 5 is a sectional view of the FIG. 4 transducer, codestrip, and sensor, and a fragmentary forward portion of the FIG. 4 carriage housing.

Our invention provides sufficient positional precision for effective coordination of two image transducers 71, 71' (FIG. 3), each in its own respective holder 62, 62' on the single carriage 61. The single transducer 71 of FIG. 2 or dual transducers 71, 71' of FIG. 3 are mounted to the forward edge of the carriage 61 as shown in FIGS. 4 and 5.

The marking-implement type of transducer 71 includes a multiplicity of individually controllable jets 72 in an array, very near the rear of the transducer. The transducer also includes an ink reservoir 73.

Just aft of the transducer 71 are a transmission-type sensor 62, slotted in its underside as shown, and the codestrip 32 passing through the sensor slot. We prefer to make the horizontal distance D (FIG. 5) between the rearmost of the jets 72 and the codestrip 32 as small as practical, and in our preferred embodiment we have succeeded in attaining a distance D of about one-half inch.

This very small spacing minimizes the longitudinal error produced by disturbances of the carriage 61 such as previously enumerated. The carriage operates on a front support and guide bar 86 (FIGS. 6 and 7) and on a like rear bar (not shown).

Figure 6:
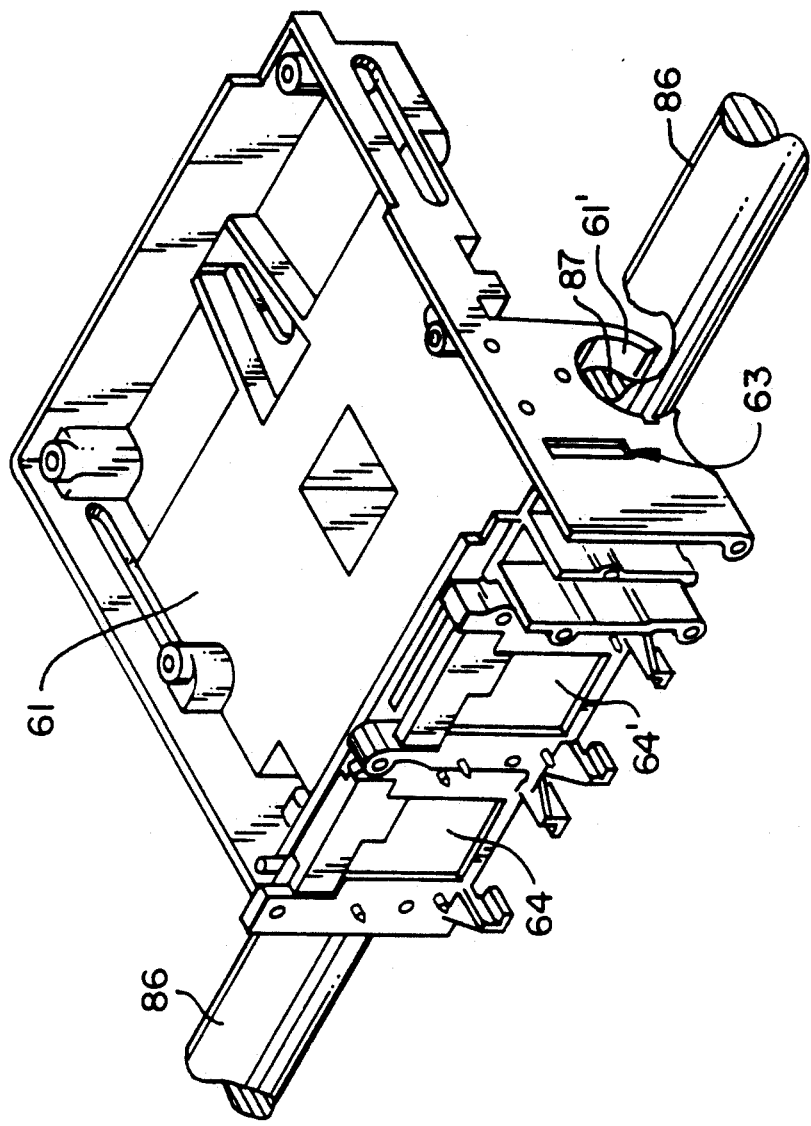
FIGS. 6 and 7 are complementary perspective views of the FIG. 3 dual-transducer carriage, together with a support rod or bar along which the carriage rides.

The front guide bar is shown partially cut away at 87 in FIG. 6 for a clearer view of the front guide cavity 61' or bushing elements. As will be understood, when the carriage 61 is impelled by its drive belt 84—and particularly at moments when the carriage is made to stop, start, or reverse direction—considerable force is generated tending to rotate the carriage about, e.g., a vertical axis relative to its supports 86 etc. and thus relative to the codestrip 32.

To minimize all such rotation or cocking, of course, the tolerances between the supports 86 etc. and guide cavities 61' etc. are made as fine as they can be, compatible with reasonably low-friction movement. Nevertheless alignment cannot be maintained perfectly; some play between the supports 86 and guides 61' always remains, and with it some dynamic misalignment.

By configuring the carriage to minimize the distance D (FIG. 5) between jets 72 and strip 32, we minimize the effects of such residual misalignment upon positional precision of the jets 72. The result of this arrangement, in conjunction with our novel codestrip, is to achieve precision of jet position to within a three-hundredth of an inch, employing interpolation from a strip with one hundred fifty orifices per inch.

This precision is sufficient to enable construction of graphics by a single transducer 71 in successive passes or swaths across the large-format image-bearing medium 21. It will be understood that such a mode of operation places particularly severe demands on precision when very thin lines are desired running fore to aft on the medium 21, since only a rather short segment of each such line is created in each pass or swath.

Figure 7:
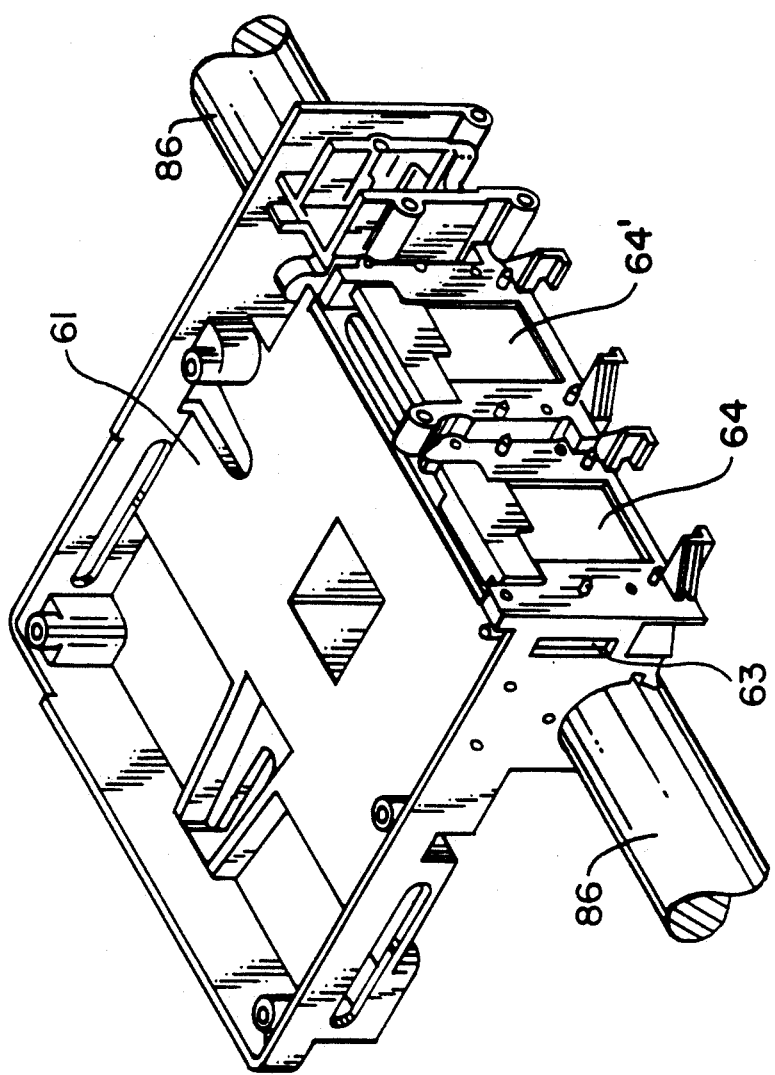

The precision just stated is also sufficient to enable construction of graphics by a pair of transducers 71, 71' in successive passes or double swaths. FIGS. 6 and 7 show that the dual-transducer attachment pads 64, 64' respectively are mutually offset slightly fore-to-aft—as well as left-to-right along the direction of carriage operation—to allow for such double-swath operation.

The slight fore-to-aft offset allows participation by both transducers in making a single fore-to-aft line during a single pass of the carriage. As will be appreciated, however, in order to accomplish such a task the two transducers must be actuated at different moments, when the carriage is at respective different positions.

In several respects, such alignment of line segments made at two different carriage positions by two different transducers is even more demanding than alignment of segments made by a single pen at a repeated carriage position. Nevertheless our invention does provide sufficient precision for this dual-swath mode of operation as well.

Still another beneficial effect of the increased precision attained through use of our invention is facilitation of bidirectional operation. Increased overall operating speed can sometimes be achieved by operating image transducers during carriage travel in each direction—rather than simply deadheading the carriage between each operating swath.

Such bidirectional operation, however, can greatly aggravate registration errors and in principle can double the relative positional error due to carriage cocking, as between two successive passes or swaths. With our invention, even such doubled errors can be made substantially imperceptible.

In addition to components needed for smooth mechanical operation along the support bars 86 etc., the carriage 61 includes electronics for operation of the sensor 62, and also for actuation of the transducer or transducers 71, 71'. These electronic systems are carried on a circuit board 65 (FIGS. 8 and 9) that is disposed at the top of the carriage 61.

The previously mentioned sensor 62 actually is mounted to the underside of the circuit board 65. In accordance with our invention the mounting point of the sensor 62 is very far forward on the circuit board 65, and in fact is on a narrow extension 65' of the board. The circuit-board extension 65' projects forward of the transducer mounting points 64, 64'.

Each transducer 71, 71' is actuated through a respective flex circuit 66, 66' (FIGS. 8 and 9), with a respective transducer solder pad 68, 68'. Because in our invention the sensor 62 is shifted forward on the carriage and circuit board, relative to earlier carriage and circuit-board configurations, the sensor 62 and codestrip 32 are positioned between the transducer mounting pads 64, 64' and the natural connection points under the circuit board 65 for the flex circuits 67, 67'.

We consider it highly desirable to maintain the layout of most components on the board that was used before our invention. That layout has been very thoroughly tested in field operations and found satisfactory in terms of resistance to interference, microphonics, etc.

Maintaining the layout used heretofore without any change would be impossible, however, in view of the shifted sensor and codestrip positions—because the codestrip would cut through the flex circuits 66, 66'. Accordingly we prefer to form each of those two flex circuits 66, 66' to circumvent the codestrip 32.

Figure 8:
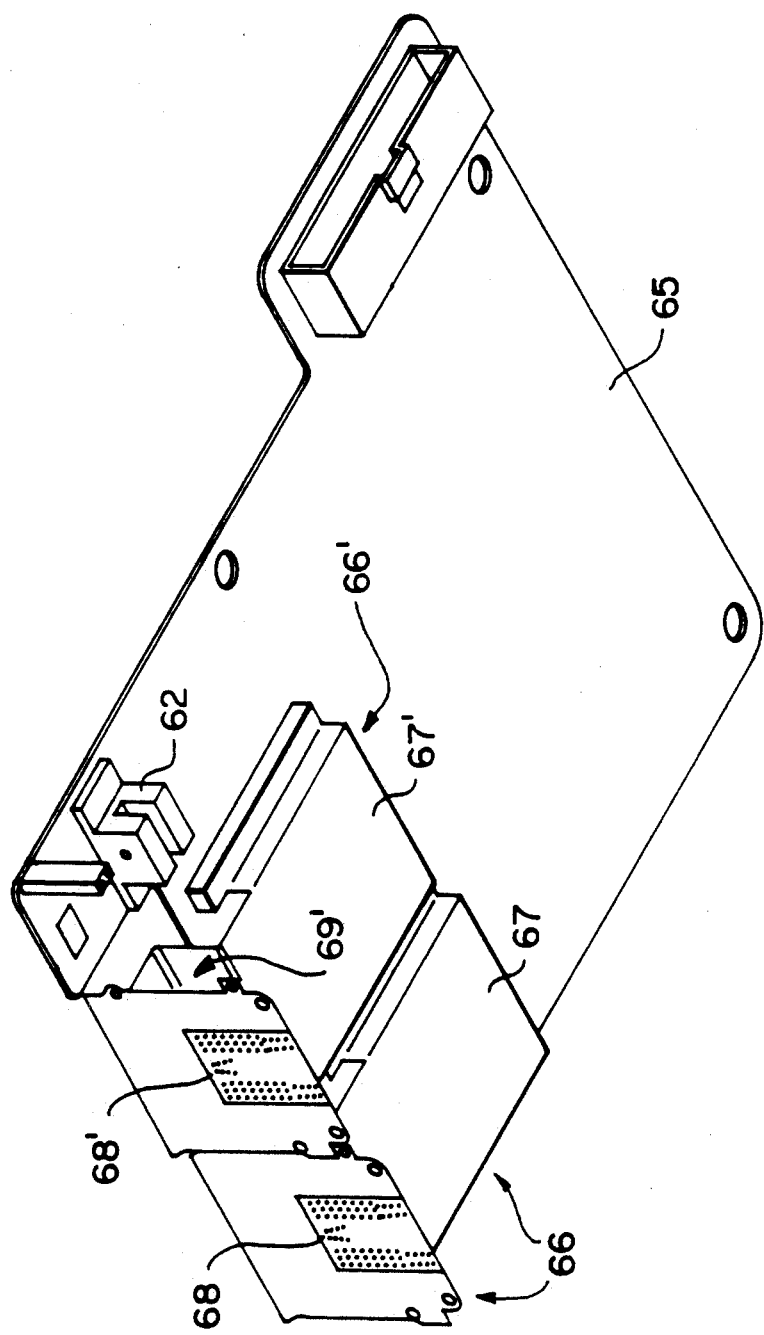
FIG. 8 is a bottom perspective view of a printed-circuit board for the dual-transducer system of FIGS. 3, 6 and 7, particularly showing flex circuits for actuation of the transducers and routing of the flex circuits over the top of the codestrip.
Figure 9:
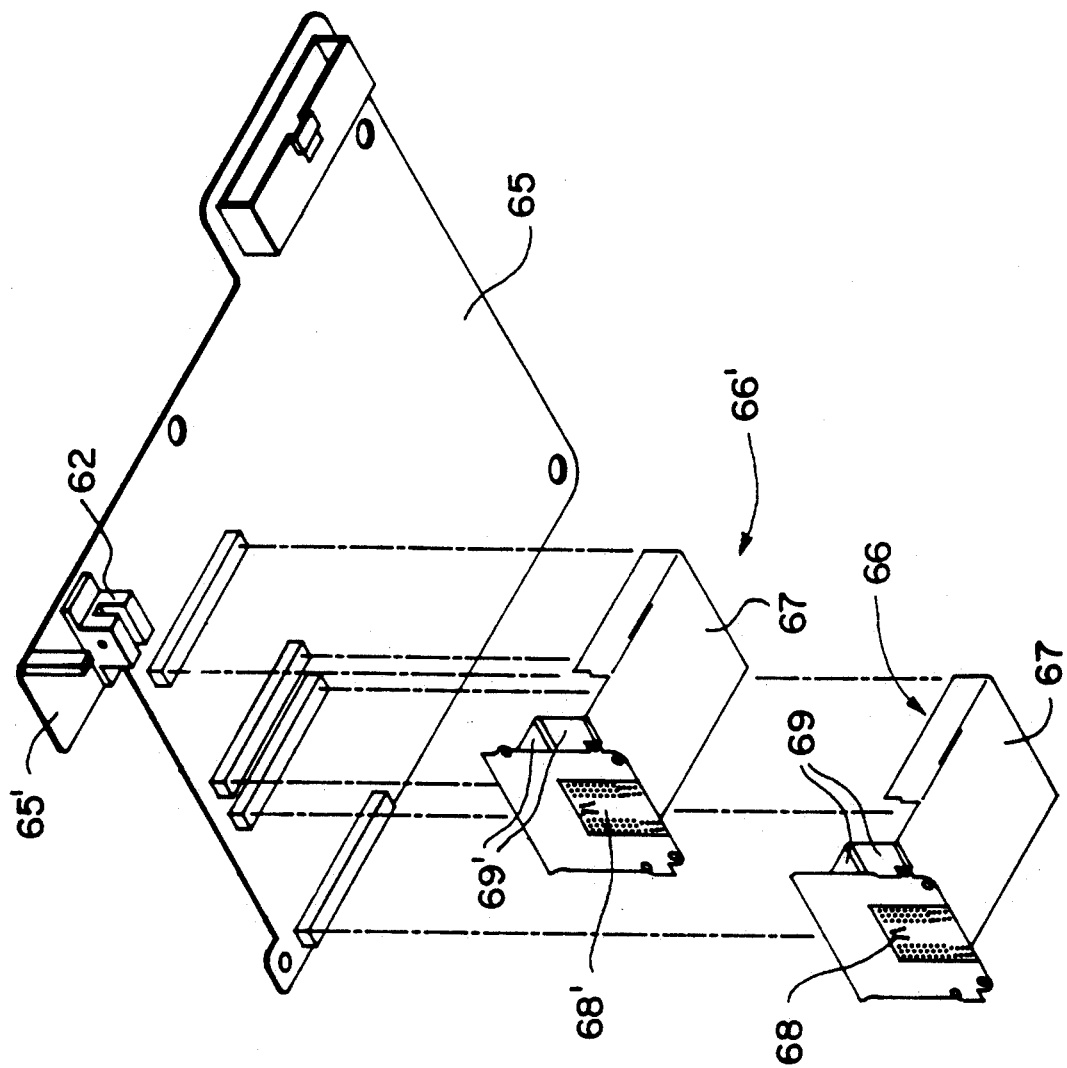
FIG. 9 is a like view but drawn "exploded"—i.e., with the flex circuits moved downward out of their operating positions.
Figure 10:
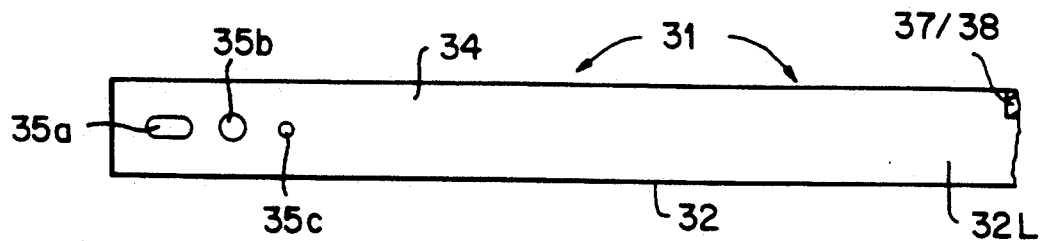
FIGS. 10 and 11 are elevations respectively showing, further enlarged, the left and right ends of the FIG. 2 codestrip, flattened.

This forming appears in FIGS. 8 and 9 as a tunnel or hoop 69, 69' in each flex circuit 66, 66' respectively. As seen, this detour in each circuit is between the generally horizontal rearward pad 67, 67' that connects to the underside of the circuit board 65, and the generally vertical forward pad 68, 68' that connects to the respective transducer 71, 71'.

Figure 13:
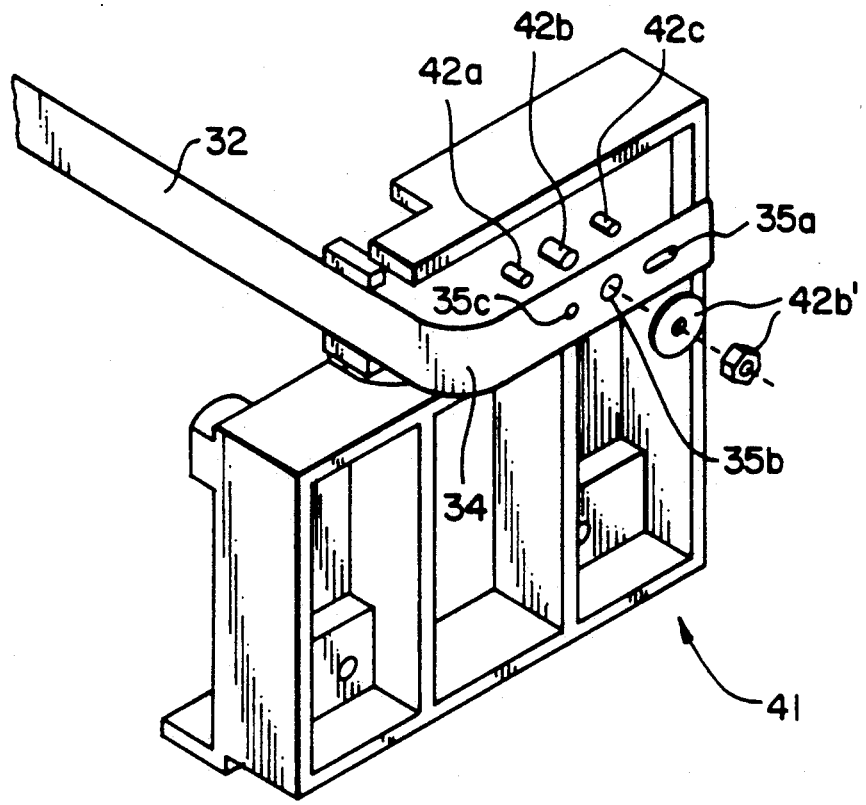
FIGS. 13 and 14 are perspective views of the left and right ends of the codestrip, wrapped generally ninety degrees around their respective stanchions.
Figure 14:
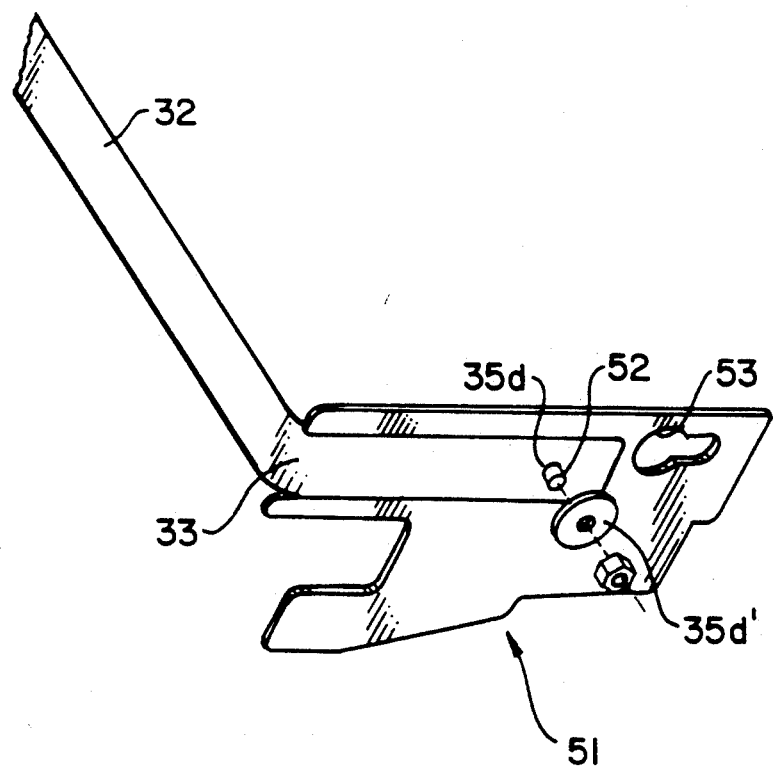
Figure 15:
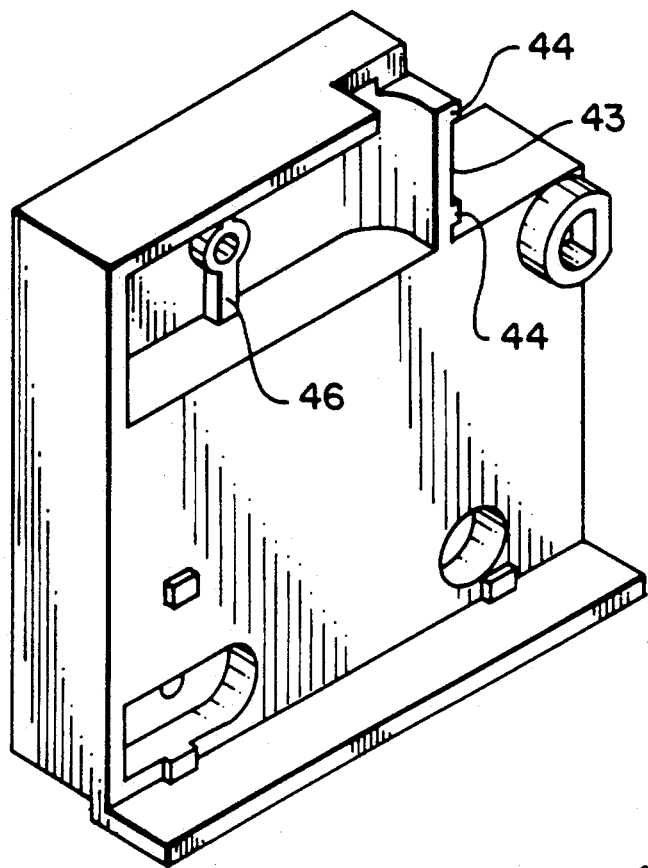
FIGS. 15 and 16 are perspective views of the inboard and outboard faces, respectively, of the left stanchion.
Figure 16:
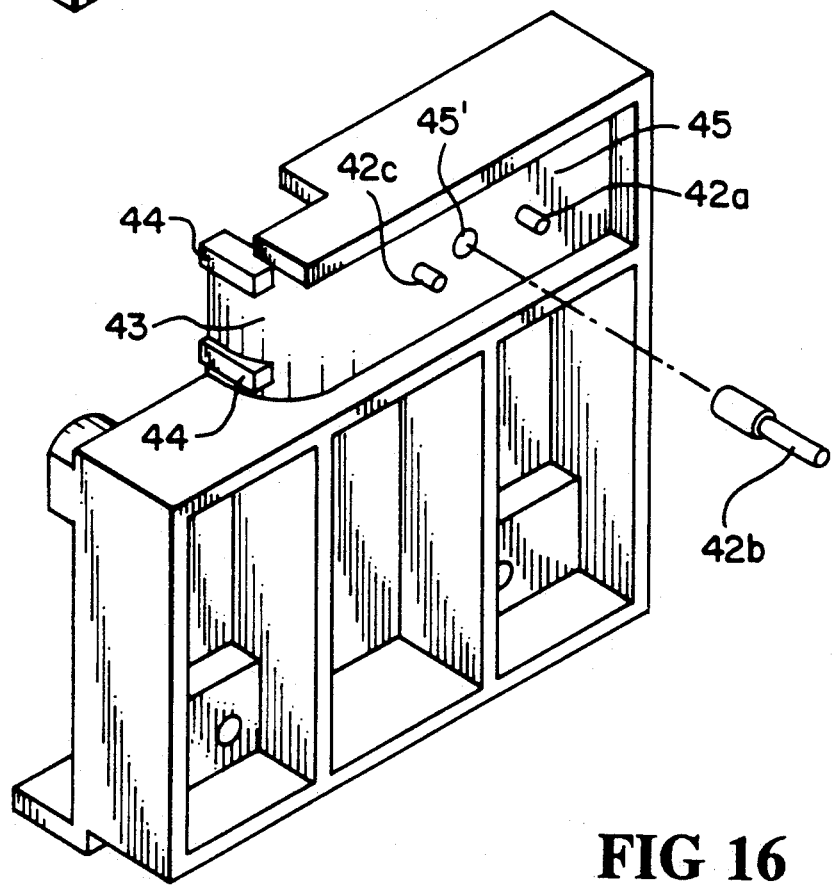

Details of the codestrip 31 itself include four mounting holes 35a through 35c at the left end and 35d at the right (FIGS. 10, 11, 13 and 14). The three holes at the left end are for attachment to a stanchion 41 that is essentially a rigid block (FIGS. 13, 15 and 16).

The middle hole 35b of these three is relatively large and bears most of the tensioning force at the left end. This hole receives a threaded stud 42b that is welded (FIGS. 15 and 16) in a through-hole 45' in the block 41; and the strip 31 is captured on the threaded stud 42b by a retaining washer and nut 42b'.

The smaller hole 35c that is nearer to the graduated part 32 of the strip 31 serves—in cooperation with a pin 42a that is a molded part of the block 41—as a precision locating point. The endmost hole 35a is a short slot, being elongated parallel to the long dimension of the strip; it receives another molded pin 42c and serves primarily to deter fishtailing of the end of the strip—i.e., to keep the strip in line.

This feature is particularly useful at initial assembly of the mechanism, in which the left end of the strip 31 is assembled to the left stanchion block 41 first; at that point the installation process is facilitated by the tendency of the stud 42b and pins 42a, 42c to prealign the strip. (In later assembly of the strip 31 to its right stanchion 51, which will be discussed shortly, such aid is unnecessary as the strip is already held extended across the housing from the left side; consequently just one stud 52 is provided.)

The antifishtailing feature also is useful in case an accident in handling of the image-bearing medium results in crumpled medium striking the strip. For additional stability, especially in event of such accidents, the strip is wrapped approximately ninety degrees around a cylindrical bed 43, passing between guides 44 at the edge of the block 41.

As best seen in FIG. 2, the left end of the strip is wrapped forward around its stanchion 41. The right end of the strip is wrapped rearward around its stanchion 51.

There the single hole 35d in the right end of the strip 31 receives a threaded stud that is held—as by welding or brazing—to the right-hand stanchion 51, which is a relatively thin plate of spring steel. A retaining washer and nut 35d' capture the strip 31 against the plate-shaped stanchion 51.

Figure 17:
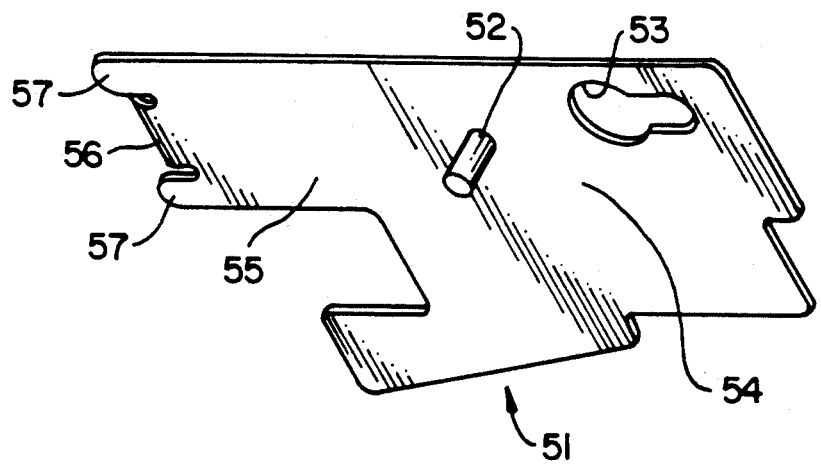
FIG. 17 is a perspective view of the outboard face of the right stanchion (also forming a codestrip-tensioning spring)
Figure 18:
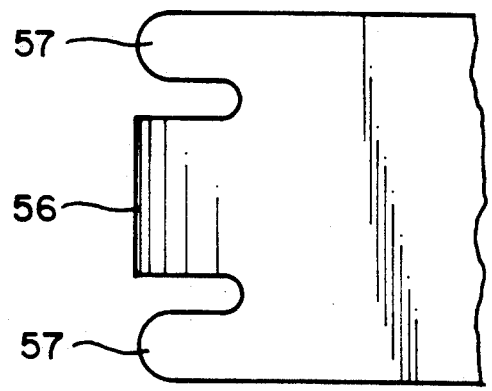
FIG. 18 is an enlarged view of certain details of the FIG. 17 right stanchion/spring, flattened.
Figure 19:
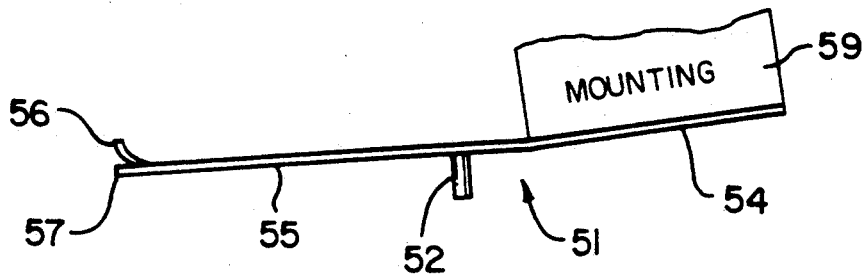
FIG. 19 is a somewhat schematic plan view of the right stanchion/spring in use, together with its mounting.

This stanchion is not a solid block, but rather is hooked by means of a keyhole-shaped slot 53 to a separate mounting block 59 (FIG. 19). The right-hand stanchion 51 is, however, formed to provide a generally cylindrical bed 56 (FIG. 17) and side guides 57. The shape of these details in the stanchion plate 51 before bending—that is, when the plate is first cut out—appears in FIG. 18.

The curved bed 56 is used for wrapping of the codestrip 31 analogously to the arrangement at the left stanchion. Before installation the stanchion plate 51 is essentially flat, except for the curved bed 56. When both stanchions and the codestrip are fully installed, however, the stanchion plate 51 bends—very generally as suggested in FIG. 19.

This bending action of the springy stanchion plate 51 provides the desired force, very roughly seven pounds, to keep the codestrip 31 under tension. The precise shape into which the stanchion plate 51 bends may include an arc, particularly along the narrower outward (i.e., unsupported) finger 55.

Figure 11:
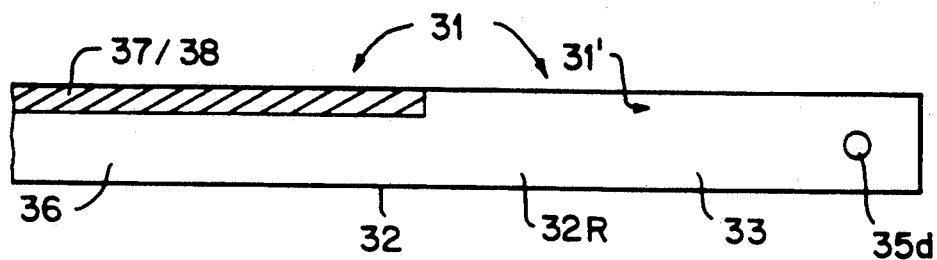
Figure 12:
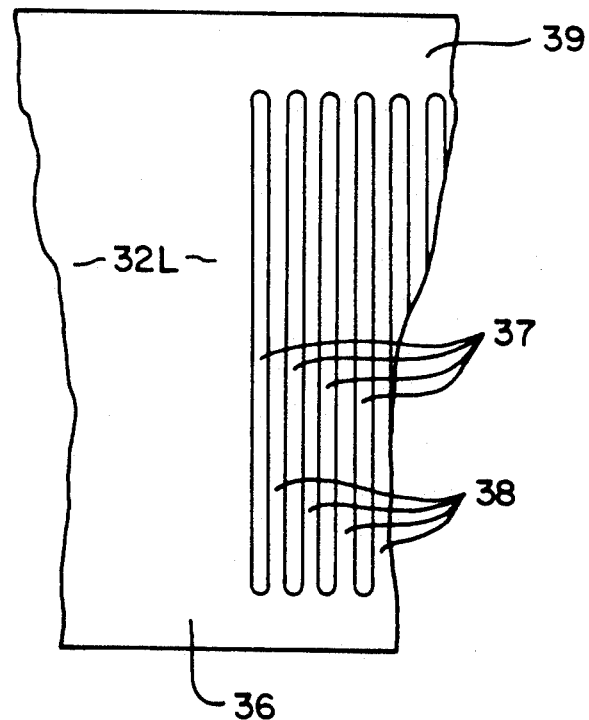
FIG. 12 is a like elevation but very greatly enlarged, showing a very small portion of the codestrip at one end of the segment of the strip that defines orifices.

Along the major part of the codestrip 31 that extends between the two stanchions 41, 51, the greater part of the strip width is occupied by a solid, unperforated band 36 which provides most of the structural strength and integrity of the strip. Structural integrity is also provided by the unperforated narrow top border 39 (FIG. 12; not visible in FIG. 11).

Between these two unperforated portions 36, 39 is etched a series of narrow vertical orifices 37, separated by narrow vertical bars 38. Nominally the orifices and bars are the same width, but as a matter of tolerances we prefer to err slightly in the direction of making the bars very slightly wider; this very slight inclination appears to be more favorable to positive operation of the electrooptical sensor system.

Following are representative dimensions of the strip 31.

|  | millimeters | inches |
|---|---|---|
| length | 1,418 | 55.8 |
| width | 13.0 | 0.51 |
| thickness | 0.051 | 0.0020 |
| mounting holes: | | |
| 34a  width | 2.2 | 0.087 |
| length | 7.2 | 0.28 |
| 34b  diameter | 3.6 | 0.14 |
| 34c  diameter | 2.2 | 0.087 |
| 34d  diameter | 3.6 | 0.14 |
| graduation orifices: | | |
| length | 3.65 | 0.144 |
| width (each) | 0.08 | 0.0031 |
| periodicity | 0.1693 | 0.00667 |
| quantity | 6,933 | |

The left edge of the first orifice is at 127.3 millimeters (5.01 inches) from the center of the third mounting hole 35c. In addition we prefer to provide five inspection holes (not shown) that are etched at the same time and from the same master as the graduation orifices; these five holes simply provide convenient identification of particular groupings of orifices for quality-control purposes.

Of the 6,933 orifices, the first and last hundred are nonfunctional. We prefer to provide these extra orifices to reduce the likelihood of out-of-specification dimensions near the ends of the etching pattern.

The image transducers illustrated in this document are thermal-inkjet pens of a type used in the "DeskJet Model 500" printer of the Hewlett-Packard Company. We currently prefer to use such pens in marking-implement embodiments of image-related devices according to our invention. Various models of such pens are available and usable with our invention, with some differences in image quality related to factors such as drawing speed, resolution or precision desired, image color, and price.

Figure 20:
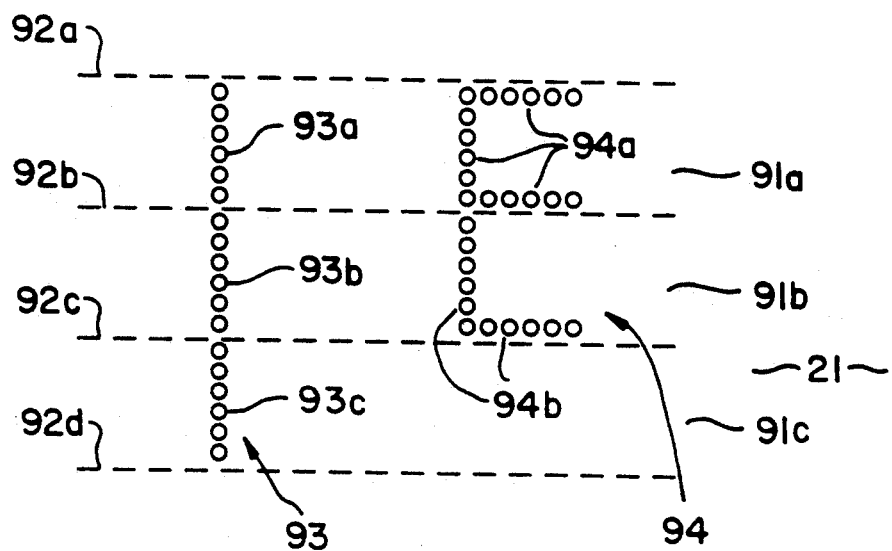
FIG. 20 is a highly diagrammatic plan view showing formation of a line and an alphanumeric character by either a single transducer (of the marking-implement type) in adjacent swaths, or dual transducers in dual swaths.

As shown very diagrammatically in FIG. 20, a multiplicity of ink droplets 93 and 94 (represented as small circles) can be placed on the image-bearing surface 21 in groups or swaths 91, by a corresponding multiplicity of jets 72 (FIG. 4) that are shifted fore and aft (up and down in FIG. 20) by movement of the image-bearing surface 21. Although for illustrative purposes just six droplets are shown in each swath, actually a considerably larger number such as, for example, fifty can be used in practice.

(The dashed lines 92 in the drawing simply represent the boundaries between adjacent swaths. They do not actually appear in any direct way on the surface 21.)

More specifically, in a first pass 91a of a single pen between boundaries 92a and 92b, a first vertical line segment is formed by merging of the ink droplets 93a, and upper portions of a capital letter "E" are analogously formed by merging of the droplets 94a. In a second pass 91b of the same single pen between boundaries 92b and 92c, a second vertical line segment is formed by droplets 93b, and lower portions of a capital letter "E" are formed by droplets 94b.

The vertical line segments and the strokes of the letter "E" are each just one droplet—i.e., between one and two pixels—wide. In the system diagrammed, the width of each pixel is one three-hundredth of an inch.

Yet, because of the precision provided by our invention, the mutual misalignment of the line segments and letter strokes is generally below the level of visual perceptibility (without magnification). Thus the imprecision is less than one pixel or, again, is less than one three-hundredth of an inch.

The same relationships obtain for a third swath 91c, formed by droplets 93c between boundaries 92c and 92d, and indeed for any number of swaths along the fore-to-aft direction of the surface 21. Thus by virtue of our invention a substantially continuous-appearing, straight-appearing vertical line can be drawn the entire length of the paper or other medium 21—by construction from a great number of individual swaths 91.

Figure 21:
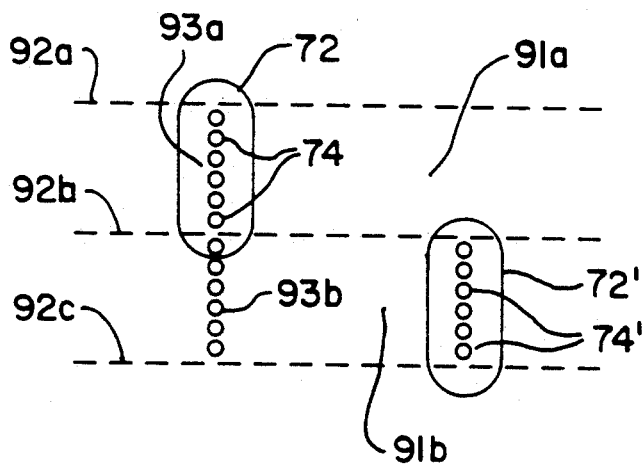
FIG. 21 is a like diagrammatic view illustrating formation of a line by dual transducers in a dual swath.

Alternatively the swaths 91a and 91b can both be drawn or laid down as a dual swath 91a–91b in a single pass of a dual-transducer system. FIG. 21 shows how this is done.

In FIG. 21 the ovals 72, 72' represent the positions of the two transducer heads, and the small dots 74, 74' within those oval shapes represent the individual jets in the two heads. The circles 93a, 93b, as in FIG. 20, represent ink droplets on the surface of the image-bearing medium 21.

As mentioned earlier the transducer jet arrays 72, 72' are offset both fore-to-aft and left-to-right. It can now be appreciated that the fore-to-aft offset corresponds to the periodicity of adjacent swaths—and, for the dual-swath arrangement, to the periodicity of the adjacent halves of each dual swath.

FIG. 21 represents a simplified situation in which the individual jets 74' of the right-hand, forward transducer 72' have already been aligned with the present position of the line of ink droplets 93b, where those individual jets 74' were actuated to produce those particular droplets. The carriage has now shifted to the right so that the transducer 72' is spaced well away from those droplets (where it may be actuated to form other images if desired) and the transducer 72 is moved into very precise alignment with the droplets 93b.

The individual jets 74 of transducer 72 are now being actuated to produce the additional ink droplets 93a as shown. As can be seen, by virtue of the precision afforded by our invention the latter droplets 93a are in excellent lateral alignment with the former droplets 93b.

Actually in preferred embodiments of our invention the jets are actuated without halting carriage movement, though that movement is relatively slow. Consequently, in timing of the transducer actuation, allowance must be made for the time of flight of the ink droplets across a gap from the transducer to the image-bearing medium.

In establishing such timing the momentum of the ink droplets comes into play as well as the velocity of the transducer. In other words, the ink must be discharged from the jets 74 a short time before those jets reach their position shown in FIG. 21.

The illustrated position in the simplified drawing of FIG. 21 therefore may be regarded as the virtual position of the transducer (for the illustrated droplet position on the medium). By "virtual position" here is meant the actual moment-of-discharge position corrected for droplet flight time.

A considerably faster slewing speed is used to traverse portions of the medium surface 21 where no image is to be created. Our invention facilitates maintaining the precision already stated, and thereby the print quality shown schematically in FIGS. 20 and 21, at both speeds—and also, as mentioned earlier, even when the jets are actuated in both directions of carriage travel for successive double swaths.

It will be understood that the foregoing disclosure is intended to be merely exemplary, and not to limit the scope of the invention—which is to be determined by reference to the appended claims.

We claim:

1. A codestrip for use in positioning a carriage of a large-format automatic image-related device; said codestrip comprising:
   a metallic strip longer than the transverse dimension of a large-format visual-image-bearing sheet;
   means, defined in the ends of the strip, for tensioned mounting of the strip to such an image-related device; and
   a series of very narrow orifices defined along the strip to serve as fine graduations for establishing position of such a carriage along the strip.

2. The codestrip of claim 1, wherein:
   the strip is longer than the transverse dimension of a D-size sheet.

3. A codestrip, for use in positioning a carriage of a large-format automatic image-related device; said codestrip comprising:
   a metallic strip longer than the transverse dimension of a large-format visual-image-bearing sheet;
   means, defined in the ends of the strip, for tensioned mounting of the strip to such an image-related device;
   wherein the metallic strip comprises a relatively broad substantially unperforated portion having structural stability when under such tensioned mounting;
   a relatively narrow unperforated border portion;
   a series of very narrow orifices defined along the strip to serve as fine graduations for establishing position of such a carriage along the strip; said series of narrow orifices being defined in the strip between the broad and narrow unperforated portions.

4. The codestrip of claim 3, wherein:
   the strip is longer than the transverse dimension of a D-size sheet.

5. A codestrip for use in positioning a carriage of a large-format automatic image-related device; said codestrip comprising:
   a metallic strip approximately two-thousands of an inch thick and longer than the transverse dimension of a large-format visual-image-bearing sheet;
   means, defined in the ends of the strip, for tensioned mounting of the strip to such an image-related device; and
   a series of very narrow orifices defined along the strip to serve as fine graduations for establishing position of such a carriage along the strip, and spaced substantially uniformly along the strip at a periodicity of substantially one hundred fifty orifices or more per inch.

6. The codestrip of claim 5, wherein the metallic strip comprises:
   a relatively broad substantially unperforated portion having structural stability when under such tensioned mounting; and
   a relatively narrow unperforated border portion;
   said series of narrow orifices being defined in the strip between the broad and narrow unperforated portions.

7. The codestrip of claim 6, wherein:
   the combined width, in the direction across the strip, of the unperforated portions is more than three times the width, in the direction across the strip, of the orifices.

8. The codestrip of claim 7, wherein:
the relatively broad unperforated portion is at least 0.25 inch wide in the direction across the strip; and
the relatively narrow unperforated portion is at most 0.04 inch wide in the direction across the strip.

9. The codestrip of claim 6, wherein:
the relatively broad unperforated portion is at least 0.25 inch wide in the direction across the strip; and
the relatively narrow unperforated portion is at most 0.04 inch wide in the direction across the strip.

10. The codestrip of claim 9, wherein:
the strip is longer than the transverse dimension of a D-size sheet.

11. A large-format automatic image-related device for use with a large piece of visual-image-bearing medium, such as paper, and comprising:
means for holding such large piece of medium;
a carriage, and support means therefor, disposed for travel of the carriage along the support means and across the holding means;
one or more image transducers retained on the carriage for interaction with such piece of visual-image-bearing medium when held in the holding means;
means for automatically determining the position of the carriage and the image transducers relative to such medium when held in the holding means;
said position-determining means including a codestrip disposed across the holding means, said codestrip being a metallic strip tensioned across the holding means and defining sensable graduations for establishing said carriage position precisely, the graduations comprising a series of very narrow orifices defined through the metallic strip.

12. The device of claim 11, further comprising:
a stanchion defined at each end of the carriage, respectively, for gripping a respective end of the metallic strip.

13. The device of claim 12, wherein:
at least one end of the strip is wrapped at least partway around its respective stanchion.

14. The device of claim 12, wherein:
each end of the strip is wrapped at least partway around said respective stanchion.

15. The device of claim 11, wherein:
the one or more image transducers are so disposed on the carriage as to only render substantially insignificant any positional perturbation, in the direction parallel to the strip, that arises between the image transducers and the metallic strip.

16. The device of claim 11, wherein:
each image transducer is a marking implement which, when positioned for marking, receives actuating signals and in response thereto creates marks on the visual-image-bearing medium.

17. The device of claim 16, wherein:
each image transducer is a compound marking implement comprising a multiplicity of individual marking elements, disposed in an array generally perpendicular to the strip;
each element receiving actuating signals independently for creating independent marks on the visual-image-bearing medium in a swath substantially parallel to the strip; and
further comprising means for effecting relative motion of the visual-image-bearing medium and the carriage in a direction generally perpendicular to the strip, whereby marks are created on the visual-image-bearing medium in adjacent swaths;
said precise establishment of carrier position facilitating precise alignment of marks in adjacent swaths.

18. A large-format automatic image-related device for use with a large piece of visual-image-bearing medium, such as paper, and comprising:
means for holding such large piece of medium;
a carriage, and support means therefor, disposed for travel of the carriage along the support means and across the holding means;
one or more image transducers retained on the carriage for interaction with such piece of visual-image-bearing medium when held in the holding means;
means for automatically determining the position of the carriage and the image transducers relative to such medium when held in the holding means;
said position-determining means including a codestrip disposed across the holding means, said codestrip being a metallic strip tensioned across the holding means and defining sensable graduations, comprising a series of very narrow orifices defined through the metallic strip, for establishing said carriage position precisely;
wherein the metallic strip comprises:
a relatively broad substantially unperforated portion having structural stability when under such tensioned mounting, and
a relatively narrow unperforated border portion,
said series of narrow orifices being defined in the metallic strip between the broad and narrow unperforated portions.

19. The device of claim 18, further comprising:
a sensor for sensing the orifices, said sensor defining a slot for passage therethrough of the strip; the slot having an open edge, at the top or bottom of the sensor, and a closed edge;
the relatively narrow unperforated border portion of the strip is disposed relatively nearer to the closed edge of the slot in the sensor.

20. The device of claim 18, wherein:
the combined width, in the direction across the strip, of the unperforated portions is significantly larger than the width, in the direction across the strip, of the orifices.

21. The device of claim 20, wherein:
the combined width, in the direction across the strip, of the unperforated portions is more than three times the width, in the direction across the strip, of the orifices.

22. A large-format automatic image-related device for use with a large piece of visual-image-bearing medium, such as paper, and comprising:
means for holding such large piece of medium;
a carriage, and support means therefor, disposed for travel of the carriage along the support means and across the holding means;
one or more image transducers retained on the carriage for interaction with such piece of visual-image-bearing medium when held in the holding means;
means for automatically determining the position of the carriage and the image transducers relative to such medium when held in the holding means;
said position-determining means including a codestrip disposed across the holding means, said codestrip being a metallic strip approximately two-thousands of an inch thick, tensioned across the holding means and defining sensable graduations, comprising a series of very narrow orifices defined through the metallic strip and spaced substantially uniformly along the metallic strip, at a periodicity of substantially one hundred fifty orifices or more per inch, for establishing said carriage position precisely.

23. A large-format automatic image-related device for use with a large piece of visual-image-bearing medium, such as paper, and comprising:
   means for holding such large piece of medium;
   a carriage, and support means therefor, disposed for travel of the carriage along the support means and across the holding means;
   one or more image transducers retained on the carriage for interaction with such piece of visual-image-bearing medium when held in the holding means;
   means for automatically determining the position of the carriage and the image transducers relative to such medium when held in the holding means;
   said position-determining means including a codestrip disposed across the holding means, said codestrip being a metallic strip approximately two-thousands of an inch thick, tensioned across the holding means and defining sensable graduations comprising a series of very narrow orifices defined through the metallic strip and spaced substantially uniformly along the metallic strip, at a periodicity of one hundred fifty orifices or more per inch, for establishing said carriage position precisely;
   whereby the position-determining means position the carriage to a precision of one three-hundredth of an inch or better.

24. The device of claim 23, wherein the metallic strip comprises:
   a relatively broad substantially unperforated portion having structural stability when under such tensioned mounting; and
   a relatively narrow unperforated border portion;
   said series of narrow orifices being defined in the metallic strip between the broad and narrow unperforated portions.

25. The device of claim 24, wherein:
   the relatively broad unperforated portion is at least 0.25 inch wide in the direction across the metallic strip; and
   the relatively narrow unperforated portion is at most 0.04 inch wide in the direction across the metallic strip.

26. The device of claim 25, wherein
   the one or more image transducers are retained on the carriage to interact with the visual-image-bearing medium within approximately one inch from the metallic strip.

27. A large-format automatic image-related device for use with a large piece of visual-image-bearing medium, such as paper, and comprising:
   means for holding such large piece of medium;
   a carriage, and support means therefor, disposed for travel of the carriage along the support means and across the holding means;
   at least two image transducers retained on the carriage for interaction with such piece of visual-image-bearing medium when held in the holding means, each image transducer being a marking implement which, when positioned for marking, receives actuating signals and in response thereto creates marks on the visual-image-bearing medium; and
   means for automatically determining the position of the carriage and the image transducers relative to such medium when held in the holding means;
   said position-determining means including a codestrip disposed across the holding means, said codestrip being a metallic strip tensioned across the holding means and defining sensable graduations for establishing said carriage position precisely;
   the marking implements being separated by a first substantially fixed distance parallel to the metallic strip and mutually offset by a second substantially fixed distance perpendicular to the metallic strip;
   whereby positional precision of the carriage facilitates good coordination of markings by the two marking implements.

28. A large-format automatic image-related device for use with a large piece of visual-image-bearing medium, such as paper, and comprising:
   means for holding such large piece of medium;
   a carriage, and support means therefor, disposed for travel of the carriage along the support means and across the holding means;
   one or more image transducers retained on the carriage for interaction with such piece of visual-image-bearing medium when held in the holding means; and
   means for automatically determining the position of the carriage and the image transducers relative to such medium when held in the holding means;
   wherein:
      the position-determining means comprise a codestrip disposed across the holding means, said codestrip being a metallic strip tensioned across the holding means and defining sensable graduations for establishing said carriage position precisely, and a sensor capable of providing information for interpolating the position of the carriage between the graduations defined by the strip;
      the position-determining means operate to a precision of substantially one three-hundredth of an inch or better; and
      the graduations defined by the strip are further apart than one three-hundredth of an inch.

29. A codestrip for use in positioning a carriage of a large-format automatic image-related device; said codestrip comprising:
   a metallic strip longer than the transverse dimension of a large-format visual-image-bearing sheet and including two substantially unperforated portions, both for extension across generally the full transverse dimension of such sheet;
   means, defined in the ends of the strip, for tensioned mounting of the strip to such an image-related device;
   at least one of the substantially unperforated portions being relatively broad and having structural stability when under such tensioned mounting; and
   a series of very narrow orifices defined along the strip between the two substantially unperforated portions to serve as fine graduations for establishing position of such a carriage along the strip.

* * * * *